United States Patent
Backes et al.

(10) Patent No.: US 10,320,229 B2
(45) Date of Patent: Jun. 11, 2019

(54) AUTO-TUNABLE WIRELESS CHARGER

(71) Applicant: Honeywell International Inc., Morristown, NJ (US)

(72) Inventors: Glen Backes, Golden Valley, MN (US); Christian Larson, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 269 days.

(21) Appl. No.: 15/152,946

(22) Filed: May 12, 2016

(65) Prior Publication Data
US 2017/0331314 A1 Nov. 16, 2017

(51) Int. Cl.
| | | |
|---|---|---|
| H02J 50/05 | (2016.01) | |
| H02J 7/04 | (2006.01) | |
| H02J 7/00 | (2006.01) | |
| H02J 50/00 | (2016.01) | |
| H02J 50/10 | (2016.01) | |
| H02J 7/02 | (2016.01) | |
| H04B 5/00 | (2006.01) | |

(52) U.S. Cl.
CPC ............ *H02J 50/05* (2016.02); *H02J 7/0042* (2013.01); *H02J 7/0057* (2013.01); *H02J 7/025* (2013.01); *H02J 7/045* (2013.01); *H02J 50/00* (2016.02); *H02J 50/10* (2016.02); *H04B 5/0012* (2013.01); *H04B 5/0037* (2013.01); *H02J 2007/0059* (2013.01)

(58) Field of Classification Search
CPC .................................. H02J 50/00; H02J 50/05
See application file for complete search history.

(56) References Cited

U.S. PATENT DOCUMENTS

| | | | |
|---|---|---|---|
| 8,143,746 B2 | 3/2012 | Marzetta et al. | |
| 9,520,905 B2 * | 12/2016 | Suzuki | H04B 5/0037 |
| 9,831,711 B2 * | 11/2017 | Miyashita | H02J 7/025 |
| 2012/0133212 A1 | 5/2012 | Kamata | |
| 2013/0241301 A1 | 9/2013 | Maeda et al. | |

(Continued)

FOREIGN PATENT DOCUMENTS

JP WO 2014037994 A1 * 3/2014 ........... H04B 5/0037

OTHER PUBLICATIONS

Wikipedia contributors. (May 20, 2018). Power dividers and directional couplers. In Wikipedia, The Free Encyclopedia. Retrieved 19:03, Jan. 16, 2019, from https://en.wikipedia.org/w/index.php?title=Power_dividers_and_directional_couplers&oldid=842181112 (Year: 2018).*

(Continued)

*Primary Examiner* — Daniel J Cavallari
(74) *Attorney, Agent, or Firm* — Brooks, Cameron & Huebsch, PLLC

(57) ABSTRACT

Devices, methods, systems, and computer-readable media for an auto-tunable wireless charger are described herein. One or more embodiments include a tuner comprising a directional coupler connected between a frequency generator and a tuning cap to receive reflections on a transmit line of the directional coupler, and a controller coupled to the directional coupler and the tuning cap to monitor the reflections on the transmit line and to adjust the tuning cap based on the monitored reflections on the transmit line.

18 Claims, 2 Drawing Sheets

(56) References Cited

U.S. PATENT DOCUMENTS

2015/0076920 A1* 3/2015 Zargham ............... H02J 5/005
307/104
2016/0141096 A1* 5/2016 Van Den Biggelaar .................
H02J 7/025
307/104

OTHER PUBLICATIONS

Beh, et al., "Automated Impedance Matching System for Robust Wireless Power Transfer via Magnetic Resonance Coupling", IEEE Transactions on Industrial Electronics, vol. 60, No. 9, Sep. 2013, 10 pages.
Beh, et al. "Basic Study of Improving Efficiency of Wireless Power Transfer via Magnetic Resonance Coupling Based on Impedance Matching", 2010 IEEE International Symposium on Industrial Electronics, Jul. 2010, 6 pp.

* cited by examiner

AUTO-TUNABLE WIRELESS CHARGER

TECHNICAL FIELD

The present disclosure relates to methods, devices, system, and computer-readable media for an auto-tunable wireless charger.

BACKGROUND

A wireless charger can utilize an electromagnetic field to transfer energy to a receiving device. In some examples, the receiving device can be an electronic device that can include a battery. In these examples, the wireless charger can provide electric power to the electronic device via the electromagnetic field. In some examples, the wireless charger can utilize an antenna or induction coil to produce the electromagnetic field. In some examples, the receiving device can include an antenna or induction coil to receive the electromagnetic field. In some examples, the receiving device can convert the energy from the electromagnetic field to electrical power for charging a battery or powering a load associated with the receiving device.

DETAILED DESCRIPTION

Figure 1:
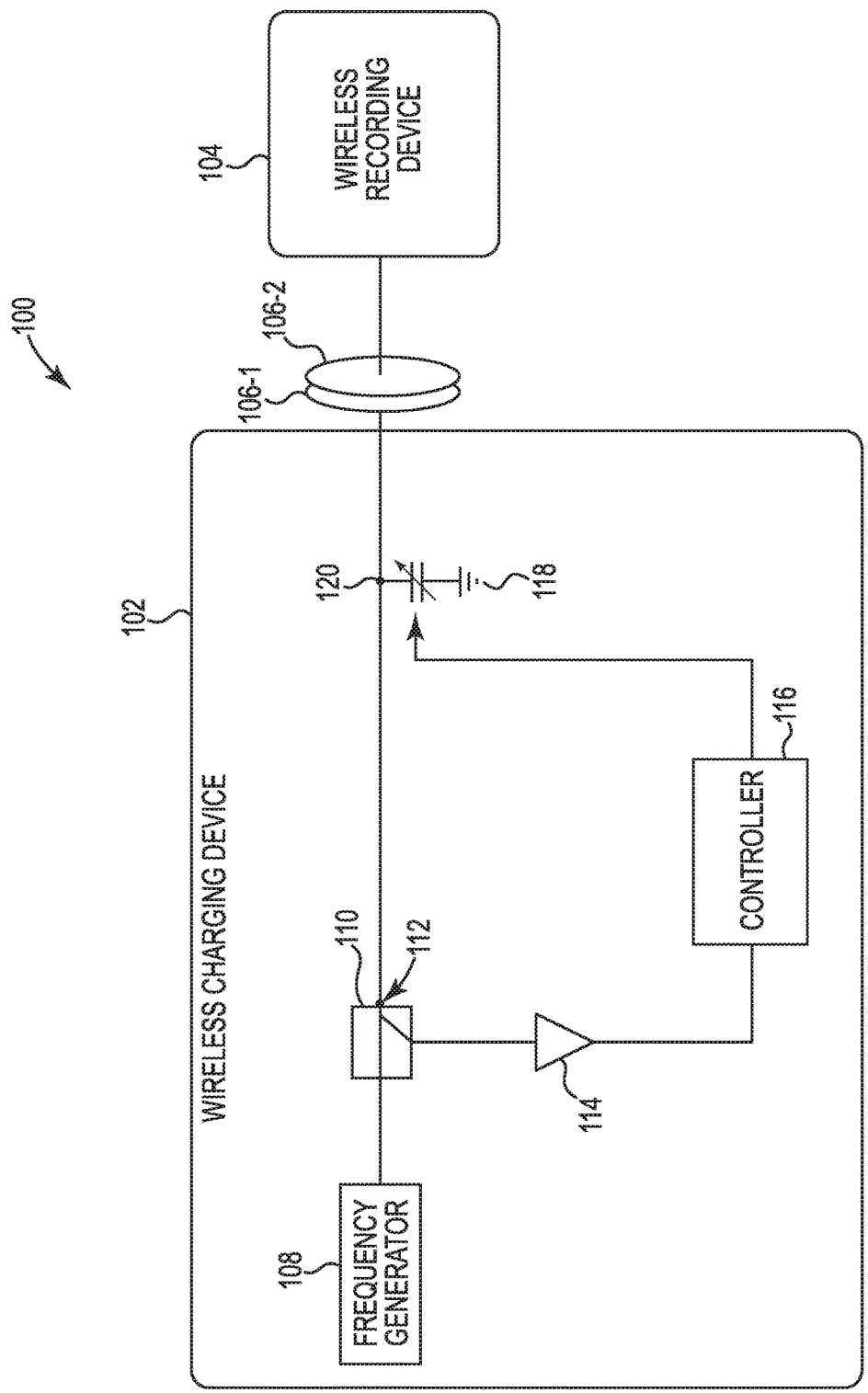
FIG. 1 is an example of a system for an auto-tunable wireless charger consistent with the present disclosure.

Devices, methods, systems, and computer-readable media for an auto-tunable wireless charger are described herein. One or more embodiments include a tuner comprising a directional coupler connected between a frequency generator and a tuning cap to receive reflections on a transmit line of the directional coupler, and a controller coupled to the directional coupler and the tuning cap to monitor the reflections on the transmit line and to adjust the tuning cap based on the monitored reflections on the transmit line.

In some examples, the auto-tunable wireless charger described herein can utilize a tuner to adjust an impedance to increase transmit efficiency between a wireless charger and a device receiving a charge from the wireless charger. In some examples, the tuner can be utilized to minimize reflections on a transmit line of the wireless charger. In some examples, the reflections can correspond to a portion of power that is not transferred to a receiving device. In some previous systems and methods, the transmit efficiency can be maximized at a start of the charging cycle between a wireless charger and a receiving device. However, a quantity of reflections can change as an electrical storage device such as battery of the receiving device charges and/or a load associated with the receiving device. For example, the quantity of reflections can change when the receiving device provides a variable load. Thus, the transmit efficiency can decrease as the battery of the receiving device charges.

The auto-tunable wireless charger described herein can dynamically tune the wireless charger throughout the charging cycle to increase the transmit efficiency as the battery of the receiving device charges and/or a load associated with the receiving device. In some examples, the auto-tunable wireless charger described herein can dynamically tune the wireless charger throughout the charging cycle to increase the transmit efficiency even when device geometries and/or device alignments change during the charging cycle. Thus, the auto-tunable wireless charger can increase the transmit efficiency at particular times during the charging cycle as well as an overall transmit efficiency for the charging cycle.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit corresponds to the drawing figure number and the remaining digits identify an element or component in the drawing. Similar elements or components between different figures may be identified by the use of similar remaining digits.

As used herein, "a" or "a number of" something can refer to one or more such things. For example, "a number of devices" can refer to one or more devices. Additionally, the designator "N", as used herein, particularly with respect to reference numerals in the drawings, indicates that a number of the particular feature so designated can be included with a number of embodiments of the present disclosure.

FIG. 1 is an example of a system 100 for an auto-tunable wireless charger consistent with the present disclosure. In some examples, the system 100 can be utilized to increase a transmit efficiency between a wireless charging device 102 and a wireless receiving device 104. As used herein, the transmit efficiency includes an efficiency of the wireless charging device 102 transferring electrical power to the wireless receiving device 104.

In some examples, the wireless charging device 102 can utilize a capacitive wireless power transfer device 106-1 coupled to the tuning cap 118. In these examples, the wireless receiving device 104 can utilize a capacitive wireless power receiving device 106-2 to receive and/or convert the electromagnetic field generated by the wireless power transfer device 106-1. In some examples, the wireless charging device 102 can utilize an inductive wireless power transfer device 106-1 coupled to the tuning cap 118. In these examples, the wireless receiving device 104 can utilize an inductive wireless power receiving device 106-2 to receive and/or convert the electromagnetic field generated by the wireless power transfer device 106-1

In some examples, the transmit efficiency can correspond to a quantity of electrical power received by the wireless receiving device. For example, a portion of power from a electromagnetic field generated by the wireless charging device 102 can be transferred and converted to electrical power by the wireless receiving device 104. In this example, a portion of power from the electromagnetic field generated by the wireless charging device 102 can be reflected by the power transfer device 106-1. In this example, the transmit efficiency corresponds to the percentage of the power from the electromagnetic field transferred and converted to electrical power by the wireless receiving device 104 compared to the percentage of power reflected.

In some examples, the wireless charging device 102 can include a frequency generator 108. In some examples, the frequency generator 108 can be utilized to generate a frequency within a particular frequency range. In some examples, the frequency generator 108 can generate a frequency between 100 megahertz (MHz) and 1 gigahertz (GHz). In some examples, the frequency generator 108 can generate a frequency that is approximately 500 MHz.

In some examples, the frequency generator 108 can be utilized to generate a relatively higher frequency range compared to previous systems and methods. For example, the relatively higher frequency range can be utilized for a wireless charging device 102 that has a relatively lower amperage provided by a power source coupled to the wireless charging device 102. In some examples, the relatively lower amperage provided to the wireless charging device 102 can be within the range of 10 milliamps (mA) to 1 amp (A). In one example, the power source can include a universal serial bus power source, which can provide approximately 500 mA. In some examples, the relatively lower amperage provided by the power source can make wireless charging at relatively lower frequency ranges to be difficult or problematic. That is, the relatively higher frequency range provided by the frequency generator 108 can enable the wireless charging device 102 to be utilized with power sources that provide a relatively lower amperage.

In some examples, the wireless charging device 102 can receive a relatively low amperage from a power source and utilize a relatively high frequency range to provide adequate power or adequate transmit efficiency to the receiving wireless device 104. In some examples, the transmit efficiency can alter during a charging cycle between the wireless charging device 102 and the wireless receiving device. For example, the transmit efficiency can degrade during the charging cycle as a battery associated with the wireless receiving device 104 becomes more fully charged. In another example, device geometries and/or device alignments can change during the charging cycle and change lower the transmit efficiency. In some examples, the wireless charging device 102 can utilize the controller 116 and tuning cap 118 to dynamically tune the wireless charging device 102 to increase the transmit efficiency during the charging cycle.

In some examples, the transmit efficiency can correspond to a quantity of reflections at a transmit line 112 of the directional coupler 110. As described herein, the reflections at the transmit line 112 can be a portion of the frequency generated by the frequency generator 108 that is reflected by the power transfer device 106-1. In some examples, the greater quantity of reflections corresponds to lower transmit efficiency and a lower quantity of reflections corresponds to a higher transmit efficiency.

In some examples, the controller 116 can monitor the quantity of reflections at the transmit line 112 of the directional coupler 110. For example, the reflections can be received at the transmit line 112 and directed to the controller 116 by the directional coupler 110. In some examples, the controller 116 can be a computing device as described herein. For example, the controller 116 can be a processing device that can execute instructions to perform a number of functions (e.g., monitor reflections at the transmit line 112, alter a state of the tuning cap 118, etc.).

In some examples, the quantity of reflections can be affected by an impedance at an intersection 120 (e.g., junction, etc.). In some examples, the impedance at the intersection 120 can be altered by the controller 116 altering states of the tuning cap 118. In some examples, the controller 116 can alter the states of the tuning cap 118 to alter the impedance at the intersection 120 and monitor the quantity of reflections for each of a plurality of state changes. In some examples, the tuning cap 118 can alter the impedance at the intersection 120 for a plurality of different states to provide a plurality of different impedance values at the intersection 120.

In some examples, the controller 116 can alter the state of the tuning cap during the charging cycle when the quantity of reflections change during the charging cycle. In some examples, the controller 116 can alter the state of the tuning cap 118 to monitor reflections corresponding to each of the plurality of different impedance values. In some examples, the controller 116 can select a state or corresponding impedance value that corresponds to a relatively low quantity of reflections. For example, the controller 116 can minimize the quantity of reflections by determining and/or selecting a state of the tuning cap 118 that corresponds to a lowest quantity of monitored reflections. That is, in some examples, the controller 116 can select an impedance level from the number of different impedance levels with a minimum quantity of reflections on the transmit line 112. In some examples, the controller 116 can alter the state of the tuning cap a plurality of times during the charging cycle to maintain a relatively high transmit efficiency and/or a relatively low quantity of monitored reflections.

In some examples, the system 100 can include an amplifier 114. In some examples, the amplifier 114 can be a gain amplifier. In some examples, the amplifier 114 can increase a power or amplitude of a signal. In some examples, the monitored reflections can be amplified by the amplifier 114 to increase the signal strength of the reflections such that the controller 116 can more easily monitor the quantity of reflections.

In some examples, the battery or load of the wireless receiving device 104 can change throughout a charging cycle or charging session. In some examples, the change can be due to a battery becoming more charged and thus providing a different load (e.g., variable load) to the wireless charging device 102. In some examples, the wireless receiving device 104 can be activated and provide a different load to the wireless charging device 102 based on the processes performed by the wireless receiving device 104. The system 100 described herein can dynamically tune the wireless charging device 102 throughout the charging cycle to increase the transmit efficiency as a battery or load of the wireless receiving device 104 changes.

Figure 2:
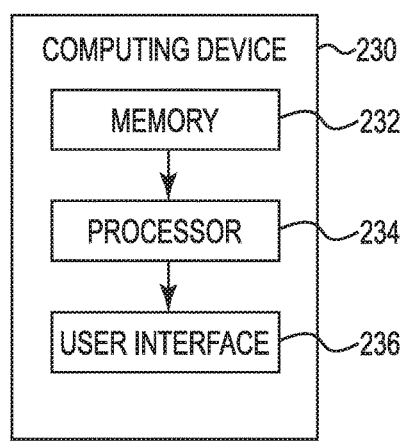
FIG. 2 is an example of a diagram of a computing device for an auto-tunable wireless charger consistent with one or more embodiments of the present disclosure.

FIG. 2 is an example of a diagram of a computing device 230 for an auto-tunable wireless charger consistent with one or more embodiments of the present disclosure. Computing device 230 can be, for example, an embedded system as described herein, among other types of computing devices.

As shown in FIG. 2, computing device 230 includes a memory 232 and a processor 234 coupled to user interface 236. Memory 232 can be any type of storage medium that can be accessed by processor 234, which performs various examples of the present disclosure. For example, memory 232 can be a non-transitory computer readable medium having computer readable instructions (e.g., computer program instructions) stored thereon.

Processor 234 executes instructions to determine presence or absence of flames and failure modes in accordance with one or more embodiments of the present disclosure. Processor 234 can also estimate the presence of the combinations of radiance of the wavelengths. Processor 234 can also execute in depth analyses computing the characteristics of the detected items for further decision making. Processor 234 can also format the alerts in form of LED signal, images, or compressed images for user viewing and transmission.

Further, although memory 232, processor 234 and user interface 236 are illustrated as being located in computing device 230, embodiments of the present disclosure are not so limited. For example, memory 232 can also be located internal to another computing resource (e.g., enabling computer readable instructions to be downloaded over the Internet or another wired or wireless connection). Part of the memory can be storage in a cloud storage. Processor 234 can be a cloud computer.

As shown in FIG. 2, computing device 230 can also include a user interface 236. User interface 236 can include, for example, a display (e.g., a screen, an LED light, etc.). The display can be, for instance, a touch-screen (e.g., the display can include touch-screen capabilities). User interface 236 (e.g., the display of user interface 236) can provide (e.g., display and/or present) information to a user of computing device 230.

Additionally, computing device 230 can receive information from the user of computing device 230 through an interaction with the user via user interface 236. For example, computing device 230 (e.g., the display of user interface 236) can receive input from the user via user interface 236. The user can enter the input into computing device 230 using, for instance, a mouse and/or keyboard associated with computing device 230, or by touching the display of user interface 236 in embodiments in which the display includes touch-screen capabilities (e.g., embodiments in which the display is a touch screen).

As used herein, "logic" is an alternative or additional processing resource to execute the actions and/or functions, etc., described herein, which includes hardware (e.g., various forms of transistor logic, application specific integrated circuits (ASICs), etc.), field programmable gate arrays (FPGAs), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A tuner, comprising:
   a directional coupler connected between a frequency generator and a tuning cap to receive reflections on a transmit line of the directional coupler;
   a controller coupled to the directional coupler and the tuning cap to monitor the reflections on the transmit line and to adjust the tuning cap based on the monitored reflections on the transmit line; and
   a capacitive wireless power transfer device coupled to the tuning cap to transmit the monitored reflections on the transmit line to a wireless power receiving device.

2. The tuner of claim 1, wherein the controller is configured to determine a quantity of received reflections for a plurality of different states of the tuning cap.

3. The tuner of claim 1, wherein the controller is configured to adjust the tuning cap a plurality of times for a charging cycle.

4. The tuner of claim 3, wherein the wireless power receiving device provides a variable load to couple to the tuning cap for the charging cycle.

5. The tuner of claim 1, wherein the frequency generator generates a frequency between 100 megahertz (MHz) and 1 gigahertz (GHz).

6. The tuner of claim 1, wherein the controller is configured to adjust the tuning cap by altering impedance at an intersection between the tuning cap and the transmit line.

7. The tuner of claim 1, wherein the controller is configured to adjust the tuning cap during the charging cycle to minimize the reflections on the transmit line.

8. The tuner of claim 7, wherein the controller is configured to select an impedance level from the number of different impedance levels corresponding to a minimum quantity of reflections on the transmit line.

9. A system for an auto-tunable wireless charger, comprising:
   a wireless charging device comprising:
      a frequency generator to generate a frequency within a frequency range;
      a directional coupler connected to the frequency generator to direct a first portion of the frequency to a capacitive wireless power transfer device and a second portion of the frequency to a controller;
      a tuning cap coupled to the capacitive wireless power transfer device and the controller to alter an impedance based on reflections on a transmit line of the directional coupler; and
   a device to receive a load from the wireless charging device.

10. The system of claim 9, wherein the load received by the device changes over a charging cycle of the wireless charging device.

11. The system of claim 10, wherein the changes of the load received by the device alters a quantity of the reflections on the transmit line.

12. The system of claim 9, wherein the wireless charging device alters transmit efficiency at specified times during the charging cycle of the wireless charging device.

13. A system for an auto-tunable wireless charger, comprising:

a wireless charging device comprising:
- a frequency generator to generate a frequency within a frequency range;
- a directional coupler connected to the frequency generator to direct a first portion of the frequency to a capacitive wireless power transfer device and a second portion of the frequency to a controller; and
- a tuning cap coupled to the capacitive wireless power transfer device and the controller to alter an impedance based on reflections on a transmit line of the directional coupler;

a wireless receiving device comprising:
- a receiving antenna to receive the frequency from the capacitive wireless power transfer device during a charging cycle;
- a converter coupled to the receiving antenna to convert the frequency to electric current; and
- an electrical storage device coupled to the converter to receive the electric current, wherein a load corresponding to the electrical storage device changes throughout the charging cycle.

14. The system of claim 13, wherein the electrical storage device is a battery.

15. The system of claim 14, wherein a load corresponding to the electrical storage device changes as a charge level of the load associated with the receiving device changes.

16. The system of claim 15, wherein the controller executes instructions to monitor the reflections on the transmit line of the directional coupler to alter the state of the tuning cap based on the monitored reflections on the transmit line.

17. The system of claim 13, wherein the controller configured to:
- instruct the tuning cap to alter the impedance to a number of different impedance levels; and
- monitor the reflections on the transmit line of the directional coupler for each of the number of different impedance levels.

18. The system of claim 17, wherein the controller configured to select an impedance level from the number of different impedance levels with a threshold quantity of reflections on the transmit line based on the monitored reflections on the transmit line.

* * * * *